United States Patent [19]

Schantz

[11] Patent Number: 5,660,871

[45] Date of Patent: Aug. 26, 1997

[54] METHOD FOR PRODUCING A NON-BLOCKING, FREE FLOWING LICORICE EXTRACT

[75] Inventor: Lloyd C. Schantz, Mequon, Wis.

[73] Assignee: Wixon-Fontarome, Inc., St. Frances, Wis.

[21] Appl. No.: 650,024

[22] Filed: May 17, 1996

Related U.S. Application Data

[63] Continuation of Ser. No. 291,763, Aug. 17, 1994, abandoned.

[51] Int. Cl.⁶ ........................................ A23L 1/22
[52] U.S. Cl. ....................... 426/638; 426/516; 426/655
[58] Field of Search ............................. 426/578, 516, 426/638, 655, 658, 660, 661

[56] References Cited

U.S. PATENT DOCUMENTS

| | | | |
|---|---|---|---|
| 3,806,617 | 4/1974 | Smylie et al. | 426/578 |
| 4,344,524 | 8/1982 | Falck et al. | 198/494 |
| 4,598,619 | 7/1986 | Leeper et al. | 83/117 |
| 4,900,241 | 2/1990 | Sigurdsson | 425/140 |

OTHER PUBLICATIONS

Perry et al. 1973. Chemical Engineers' Handbook. McGraw–Hill Book Co. New York. pp. 21–39 to 21–41.

Lees et al. 1985. Sugar Confectionery and Chocolate Manufacture. pp. 269–277.

*Primary Examiner*—Anthony J. Weier
*Attorney, Agent, or Firm*—Godfrey & Kahn, S.C.; Adam L. Brookman

[57] ABSTRACT

A method for processing a food product into a free-flowing form includes forming the food product into a substantially homogeneous mixture; transferring the mixture into an extruding apparatus; extruding the mixture; severing the extruded food product into pieces having predetermined lengths; and curing the pieces by exposing same to moving air.

14 Claims, No Drawings

METHOD FOR PRODUCING A NON-BLOCKING, FREE FLOWING LICORICE EXTRACT

SPECIFICATION

This application is a continuation of application Ser. No. 08/291,763, filed Aug. 17, 1994, now abandoned.

1. FIELD OF THE INVENTION

The present invention relates to a method for processing a food product, such as a licorice extract, from block, paste, or spray-dried form into a free-flowing form, and more specifically to a process wherein the licorice extract is sequentially homogenized, extruded, severed into pieces, and cured such that the resultant pieces do not adhere to each other.

2. BACKGROUND OF THE INVENTION

An important factor in using various ingredients in the food industry is the ability to keep such ingredients in free-flowing form. For example, substances that adhere or otherwise block together must be mechanically broken apart or separated in an additional processing step in order to be added as an ingredient in a mixture. Consequently, many food products have anti-caking or anti-blocking agents added to their respective compositions in order to maintain the substances in free-flowing form. Further, other substances must be stored at specific temperatures or humidity levels to prevent caking or blocking.

In addition to the foregoing, some food substances, such as licorice, for example, cannot presently be easily maintained in a free-flowing form. As should be understood, licorice is a widely used flavoring ingredient in the food, tobacco, pharmaceutical, and fragrance industries. In this regard, licorice is presently commercially available in three states: solid blocks; paste; and spray-dried forms. While these three forms of licorice are widely used in the market segments noted above, they do have individual shortcomings in that none of the specific forms have all the physical characteristics which are desired for ingredients which are employed in each of the aforementioned industries.

For example, the block form of licorice is very cumbersome to work with. In this regard, pieces must be broken off the block, as by chiseling, crushing, or the like, in order to be added to a given preparation. This method, of course, results in the formation of individual pieces having little consistency with respect to size, shape, surface area, or weight. Consequently, obtaining specific amounts of licorice from blocks to be added to a preparation is not only laborious, but inexact. Also, the individual pieces obtained from the large block have a propensity to adhere to each other, thereby further complicating the preparation of a composition.

Further, the paste form of licorice extract is a thick, viscous semi-solid that is also difficult to handle. Thus, once again, removing precise amounts of the paste is not a simple process. Moreover, this form of licorice extract is considered, under some environmental conditions, to be quite messy, making the packaging of same very difficult.

Still further, the spray-dried form of the licorice extract noted above, is essentially provided in a powdered state, but still this form has several shortcomings that detract from its usefulness. In this regard, this form of licorice is hygroscopic and, consequently, is very susceptible to caking into a mass having characteristics little different from the block form. Thus, the spray-dried form must be kept in an environment with low humidity. This processing step, of course, adds to the cost of processing the licorice.

For the foregoing reasons, there is a need for a method for producing a free-flowing form of licorice that is easily packaged, not susceptible to caking, and further, does not require the utilization of a closely regulated environment.

3. SUMMARY OF THE INVENTION

Therefore, it is an object of the present invention to provide a method for producing a food product, such as licorice extract, into a free-flowing form.

Another object of the present invention is to provide a method for creating a free-flowing form of the food product that is easy to package, handle, and measure.

A further object of the present invention is to provide a method for creating a free-flowing form of the food product that will not cake, block, or adhere under ambient atmospheric conditions.

A further object of the present invention is to provide a method for processing a food product that utilizes conventional machinery and devices common to the food processing industry.

A further object of the present invention is to provide a method for processing a food product and wherein the machinery utilized in the process is characterized by its simplicity of construction, ease of utilization, and low cost of acquisition and maintenance.

A further object of the present invention is to provide a method for processing a food product and wherein the process does not materially alter the physical characteristics of the final food product in any noticeable manner.

A further object of the present invention is to provide a method for processing a food product which is not time consuming, is relatively cost effective, and which further avoids the detriments associated with the prior art methods and practices utilized heretofore.

These objects, and other aspects and advantages of the present invention are achieved in a method for processing a food product into free-flowing form which includes the steps of forming the food product into a substantially homogeneous mixture; transferring the mixture into an extruding apparatus where the mixture is extruded; cutting the extruded product into pieces of predetermined lengths; and curing the food product by exposing it to moving air.

More particularly, the invention also provides a method for processing licorice extract into a free-flowing form which includes, as a first step, substantially homogenizing the licorice extract and transferring the homogenized mixture to an extruder assembly. As should be understood, the extruder assembly maintains the temperature of the mixture at a predetermined temperature of not greater than about 80° C. Upon exiting the extruder, the food product is immediately cooled to a temperature of about 70° C., and then forced through an orifice with a predetermined diameter. The extruded product is then transferred to a movement assembly which is traveling at a speed which is synchronized relative to the rate of extrusion. While traveling on the movement assembly, the extruded extract is further cooled to a temperature of about 35° C. to about 40° C. The extruded extract is then cut or severed into pieces having predetermined lengths, and these pieces are then sorted as to size by passing them over a sorting assembly which has a plurality of pores having predetermined pore sizes. These pieces are subsequently cured by exposing them to moving air for a predetermined period of time.

4. DESCRIPTION OF THE PREFERRED EMBODIMENT

The present invention relates broadly to a method of processing a food product into a free-flowing form, and more specifically, to a method in which a food product, such as a licorice extract, is sequentially homogenized; extruded; cooled; cut; and cured, resulting in a free-flowing food product that will not normally adhere to itself under ordinary ambient environmental conditions. This invention is particularly useful in the processing of licorice extract and will be described in connection with that application, although it should be understood that the present invention is not specifically limited to this food product and may find usefulness with other similar food products.

The homogenization step of the present invention involves acquiring licorice extract in its commercially available forms, for example, block, paste, or spray-dried, and treating it such that it results in a substantially homogeneous mixture. Licorice extract with varying glycyrrhizin levels, typically ranging from about 12% to about 30% can be employed. In this first step, the extracts are reduced to a randomly sized form, typically less than about one inch (1") [25.4 mm] in diameter, by processing the extracts through, for example, a lump breaker or a Fitz mill. Other methods well known in the art can also be used. This food product is then further reduced to a substantially homogeneous mixture by blending, as by the use of a commercial blender, for example. Following blending, the mixture is transferred at a substantially fixed velocity to an extruding assembly by a movement apparatus, such as, for example, by a moving cleated belt.

The extruding step utilizes an extruding apparatus. A commercially acceptable extruding apparatus can be secured under the trade designation Bausano TR2/140/15 twin screw extruder. The substantially homogeneous mixture is loaded into the extruding apparatus by way of a hopper, for example. The extruding apparatus can be, as noted above, a twin screw extruder with counter-rotating screws rotating at predetermined rates of rotation. However, extruding apparatuses are not limited to the twin screw variety and may also include, for example, single screw, ram, or other similar extrusion methods. The extruding apparatus is equipped with a temperature regulation mechanism (not shown) which maintains the temperature of the homogenized food product at less than about 80° C. throughout substantially the entire extrusion process. During the extrusion process, the mixture is forced through a die having an orifice with a predetermined diameter, which ranges from about 2 mm to about 8 mm, thereby forming the extruded food product. The throughput of the machine varies with the size of the die orifice, with a typical value of about 150 kg/hr for a 5 mm orifice being employed.

Prior to extrusion, however, a cooling step must occur which includes an initial cooling of the food product to about 70° C.±5° C. To achieve this cooling, the extruding apparatus utilizes a forming head which initially cools the semi-fluid extruded product to the aforementioned temperature. Upon exiting the die orifice, the extruded food product is then deposited onto a movement assembly, such as, for example, a perforated belt, that is traveling at a speed which is substantially synchronized with the rate of extrusion. As the food product travels along on the movement assembly, the extruded food product is further cooled by exposure to ambient or desiccated air to a preferred temperature range of about 35° C. to about 40° C.

The cutting step of the present process, as noted above, further includes severing the extruded product into pieces with predetermined lengths, typically ranging from about 2 mm to about 150 mm. The extruded food product can be cut by numerous cutting apparatuses and assemblies, such as, for example a guillotine-type cutter or a rotary cutter. Under most circumstances, the length of the piece of food product is regulated by controlling the stroke rate of the specific cutting apparatus employed.

The severed pieces are subsequently sorted as to size by passing the pieces over a sorting assembly, such as, for example, a vibratory sifter, which has a plurality of pores of a predetermined size. As should be understood, the pore size determines the size of the pieces that will pass through the sorting assembly. Those skilled in the art will recognize, of course, that the pieces can also be sized by other means.

The curing step of the present invention includes exposing the pieces of food product to moving air for a predetermined time. In this regard, either ambient or dessicated air may be used to cure the pieces, depending upon the current atmospheric conditions and the composition of the food product. More specifically, the pieces of food product are exposed to the moving air for a period of time having a typical duration of about 12 to 36 hours by being placed in perforated trays or similar devices. The cured food product is finally packaged in multi-walled paper bags, polylined corrugated boxes, fiber drums, or bulk totes.

EXAMPLE I

Approximately 250 lbs of block-type licorice having glycyrrhizin levels in the range of about 12-30%, by weight, was supplied to a Fitz mill where it was reduced to randomly shaped particles having a size of less than 1 inch (25.4 mm) in diameter. The treated licorice was then supplied to a commercial blender where it was thoroughly mixed and then loaded directly into the holding hopper of a Bausano TR2/140/15 twin screw extruder. The extruder assembly was set at a throughput speed of approximately 150 kg/hr and further was adjusted to maintain the licorice at a temperature not to exceed 80° C. A forming head was attached to the extruder assembly, and which cooled the extruded licorice to a temperature of approximately 65°-75° C. A 5 mm diameter die hole was employed with the extruder assembly. The extruded licorice was removed from the die hole by a conveyor belt and further exposed to a stream of air which was used to further cool the extract to a temperature of about 35°-40° C. A rotary cutter was then employed to reduce the licorice to pieces having lengths of approximately 2 mm-15 mm. The resulting licorice pieces were then sorted as to size by a vibratory sifting bed and then stored in perforated trays to cure by exposure to dehumidified air for 12 hrs. Following packaging in polylined corrugated boxes, and storage under normal warehouse conditions, the licorice was inspected for any signs of blocking, caking, or other conditions which would impede its flowability. None was found.

Therefore, it will be seen that the resulting food product formed by this invention does not adhere or cake to itself under ordinary storage conditions, and further, the invention provides an effective means by which a normally sticky, and difficult to handle food product can be quickly, easily, and economically converted to a flowable food product while simultaneously preserving the flavor and other essential characteristics of the food product.

Although the invention has been herein shown and described in what is conceived to be the most practical and preferred embodiment, it is recognized that departures may be made therefrom within the scope of the invention which is not to be limited to the illustrative details disclosed.

Having described my invention, what I claim as new and desire to secure by Letters Patent of the United States is:

1. A method for processing a licorice extract into flee-flowing form, comprising the steps of:
   (a) forming the licorice extract into a substantially homogeneous mixture;
   (b) transferring the homogeneous licorice extract mixture into an extruding apparatus;
   (c) extruding said homogeneous licorice extract mixture in accordance with a predetermined temperature profile;
   (d) severing extruded licorice extract into pieces having predetermined lengths; and
   (e) curing the pieces of extruded licorice extract by exposing the pieces to moving air for a period of time in excess of 12 hours to achieve a form of licorice extract which will not block if the pieces are placed in contact with one another.

2. A method according to claim 1, wherein the substantially homogeneous licorice extract mixture is disposed in fluid-flowing receiving relation relative to said extruding apparatus.

3. A method according to claim 2, wherein the licorice extract mixture is maintained at a first predetermined temperature during a first portion of the extrusion process.

4. A method according to claim 3, wherein the first predetermined temperature is less than about 80° C.

5. A method according to claim 4, wherein the extruding apparatus has an orifice with a predetermined diameter in a range from about 2 mm to about 8 mm.

6. A method according to claim 5, wherein the extruded licorice extract is cooled to a second predetermined temperature prior to passing through the orifice.

7. A method according to claim 6, wherein the second predetermined temperature is about 70° C.±5° C.

8. A method according to claim 7, wherein the extruded licorice extract is transferred to a cutting assembly by a movement assembly.

9. A method according to claim 8, wherein the movement assembly is synchronized with a predetermined rate of extrusion.

10. A method according to claim 9, wherein the extruded licorice extract is cooled on the movement assembly to a third predetermined temperature.

11. A method according to claim 10, wherein the third predetermined temperature is about 35° C. to 40° C.

12. A method according to claim 10, wherein the pieces are sorted as to size by passing same over a sorting assembly having predetermined pore sizes.

13. A method for processing licorice extract into free-flowing form, comprising:
   (a) substantially homogenizing the licorice extract;
   (b) transferring the homogeneous licorice extract at a substantially fixed velocity to an extruder assembly having at least one outlet orifice of a predetermined diameter;
   (c) moving the homogeneous licorice extract through the extruder assembly, in accordance with a predetermined temperature profile such that the licorice extract is maintained at a temperature of less than about 80° C., wherein the homogeneous licorice extract is cooled to a temperature of about 70° C.±5° C. prior to passing through said at least one outlet orifice;
   (d) depositing the extruded extract onto a movement assembly traveling at a synchronized speed relative to a predetermined rate of extrusion;
   (e) cooling the extruded licorice extract on the movement assembly to a temperature of about 35° C. to 40° C.;
   (f) cutting the cooled extruded licorice extract into pieces of predetermined length;
   (g) curing said pieces by exposure to moving air for a predetermined period of time of at least 12 hours to achieve a form of licorice extract which will not block if the pieces are placed in contact with one another.

14. A free-flowing licorice extract product, pieces of which will not block when maintained in contact made by the process comprising the steps of:
   (a) forming the licorice extract into a substantially homogeneous mixture;
   (b) transferring the homogeneous licorice extract mixture into an extruding apparatus having at least one outlet orifice;
   (c) extruding said homogeneous licorice extract mixture in accordance with a predetermined temperature profile such that the licorice extract is maintained at a temperature of less than about 80° C., and wherein the homogeneous licorice extract is cooled to a temperature of about 70° C.±5° C. prior to passing through said at least one outlet orifice;
   (d) severing extruded licorice extract into pieces having predetermined lengths; and
   (e) curing the pieces of extruded licorice extract by exposing the pieces to moving air at a temperature between 35° C. and 40° C. for a period of time in excess of 12 hours.

* * * * *